(12) United States Patent
Rey et al.

(10) Patent No.: US 6,735,936 B2
(45) Date of Patent: May 18, 2004

(54) VARIABLE AREA NOZZLE FOR GAS TURBINE ENGINES DRIVEN BY SHAPE MEMORY ALLOY ACTUATORS

(75) Inventors: Nancy M. Rey, Glastonbury, CT (US); Robin Mihekun Miller, Ellington, CT (US); Thomas G. Tillman, West Hartford, CT (US); Robert M. Rukus, Vernon, CT (US); John L. Kettle, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 248 days.

(21) Appl. No.: 09/824,419

(22) Filed: Apr. 2, 2001

(65) Prior Publication Data

US 2002/0073691 A1 Jun. 20, 2002

Related U.S. Application Data

(62) Division of application No. 09/517,937, filed on Mar. 30, 2000, now Pat. No. 6,318,070.

(51) Int. Cl.⁷ ................................................ F02K 1/12
(52) U.S. Cl. ........................ 60/226.3; 60/232; 244/219
(58) Field of Search ................................ 60/232, 226.3; 239/265.33, 265.35, 265.37, 236.39; 244/219; 337/140

(56) References Cited

U.S. PATENT DOCUMENTS

| | | | | |
|---|---|---|---|---|
| 4,053,124 A | * | 10/1977 | Cole | 244/219 |
| 4,427,168 A | * | 1/1984 | McKinney et al. | 244/214 |
| 4,524,343 A | * | 6/1985 | Morgan et al. | 357/140 |
| 4,553,722 A | * | 11/1985 | Cole | 244/219 |
| 4,559,512 A | * | 12/1985 | Yaeger et al. | 337/140 |
| 4,605,187 A | * | 8/1986 | Stephenson | 254/216 |
| 4,761,955 A | * | 8/1988 | Bloch | 60/528 |
| 4,811,564 A | * | 3/1989 | Palmer | 60/527 |
| 5,114,104 A | * | 5/1992 | Cincotta et al. | 244/219 |
| 5,150,864 A | | 9/1992 | Roglin et al. | 244/219 |
| 5,158,252 A | * | 10/1992 | Sakurai | 244/219 |
| 5,186,420 A | | 2/1993 | Beauchamp | 244/219 |
| 5,396,769 A | * | 3/1995 | Brudnicki | 60/528 |
| 5,419,788 A | * | 5/1995 | Thoma et al. | 148/402 |

FOREIGN PATENT DOCUMENTS

| | | |
|---|---|---|
| GB | 750307 | 6/1956 |
| JP | 51-8414 | 1/1976 |
| JP | 04342695 | 11/1992 |
| JP | 5-3098 | 1/1993 |
| JP | 07237599 | 9/1995 |
| RU | 2 063 534 C1 | 7/1997 |

OTHER PUBLICATIONS

Copy of European Search Report dated Aug. 5, 2003.

* cited by examiner

*Primary Examiner*—Ted Kim
(74) *Attorney, Agent, or Firm*—McCormick, Paulding & Huber LLP

(57) ABSTRACT

A gas turbine engine includes a variable area nozzle having a plurality of flaps. The flaps are actuated by a plurality of actuating mechanisms driven by shape memory alloy (SMA) actuators to vary fan exist nozzle area. The SMA actuator has a deformed shape in its martensitic state and a parent shape in its austenitic state. The SMA actuator is heated to transform from martensitic state to austenitic state generating a force output to actuate the flaps. The variable area nozzle also includes a plurality of return mechanisms deforming the SMA actuator when the SMA actuator is in its martensitic state.

7 Claims, 8 Drawing Sheets

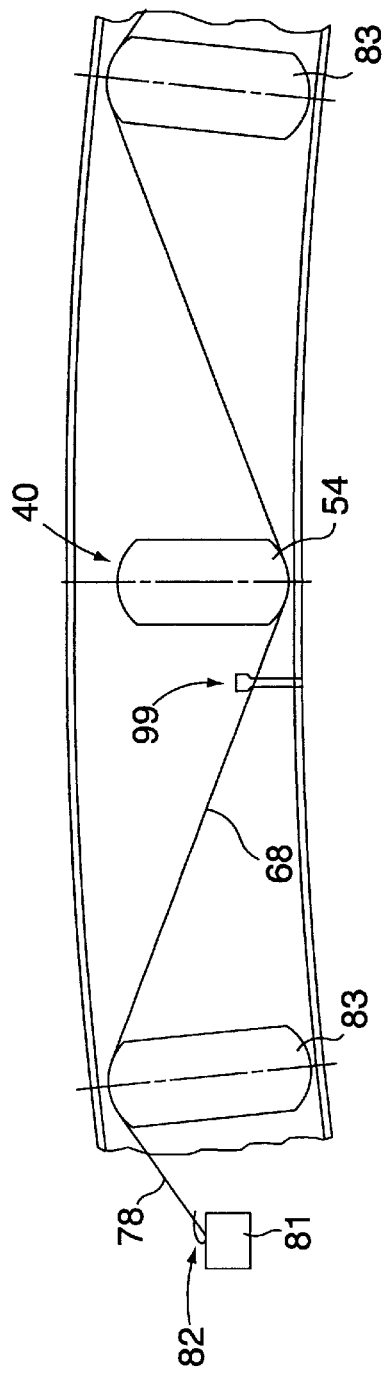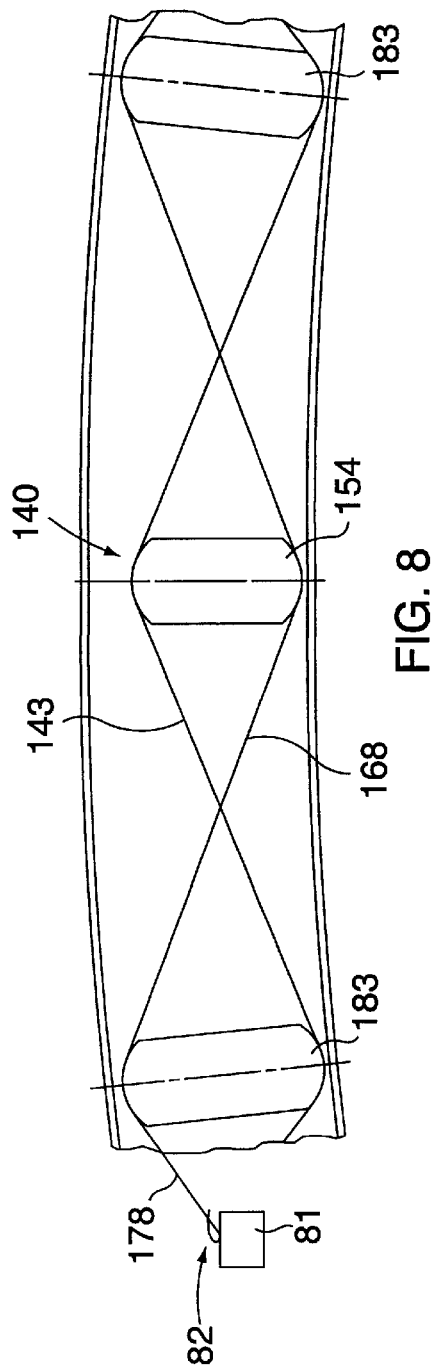

VARIABLE AREA NOZZLE FOR GAS TURBINE ENGINES DRIVEN BY SHAPE MEMORY ALLOY ACTUATORS

CROSS-REFERENCE TO RELATED APPLICATION

This application is a divisional application of Ser. No. 09/517,937, filed Mar. 30, 2000, now U.S. Pat. No. 6,218,070.

This application relates to an application entitled "Shape Memory Alloy Bundles and Actuators", having Ser. No. 09/517,938, filed on Mar. 3, 2000 and assigned to a common assignee.

BACKGROUND OF THE INVENTION

1. Technical Field

This invention relates to gas turbine engines and, more particularly, to variable area nozzles driven by shape memory alloy actuators therefor.

2. Background Art

Conventional gas turbine engines include a fan section and a core engine with the fan section having a larger outer diameter than that of the core engine. The fan section and the core engine are disposed sequentially about a longitudinal axis and are enclosed in a nacelle. An annular path of primary airflow passes through the fan section and the core engine to generate primary thrust. An annular path of duct or fan flow, disposed radially outward of the primary airflow path, passes through the fan section and exits through a fan nozzle to generate fan thrust.

The fan nozzles of conventional gas turbine engines have fixed geometry. The fixed geometry fan nozzles must be suitable for take-off and landing conditions as well as for cruise conditions. However, the requirements for take-off and landing conditions are different from requirements for the cruise condition. For cruise conditions, it is desirable to have a smaller diameter fan nozzle for increasing cruise performance and for maximizing fuel efficiency, whereas, for take-off and landing conditions, smaller diameter fan nozzles may cause an engine stall. Therefore, in many conventional engines, the cruise performance and fuel efficiency are often compromised to ensure safety of the gas turbine engine at take-off and landing.

Some gas turbine engines have implemented variable area nozzles. The variable area nozzles have the ability of having a smaller fan exit nozzle diameter during cruise conditions and a larger fan exit nozzle diameter during take-off and landing conditions. The existing variable area nozzles are either hydraulically or pneumatically actuated and result in complex mechanisms that require extensive maintenance. Most commercial aircraft prefer to avoid additional maintenance. Furthermore, the existing variable area nozzle mechanisms add significant weight to the engine. As is well known in the art, the extra weight adversely effects the overall performance of the aircraft. The additional weight reduces aircraft range and can result in additional fuel consumption for operation of the engine. Therefore, it is critical in gas turbine engine fabrication to avoid a weight increase, since the weight increase resulting from the addition of a variable area nozzle typically negates benefits gained from improved fuel efficiency resulting from the reduced diameter of the variable area nozzle during cruise conditions. Thus, although variable area nozzles have been introduced into some gas turbine engines, the use of existing variable area nozzles on most aircraft is not practical.

Therefore, it is desirable to develop a variable area nozzle that does not require extensive maintenance and does not add significant weight to the gas turbine engine.

SUMMARY OF THE INVENTION

It is an object of the present invention to provide a gas turbine engine with a variable area nozzle that does not significantly increase the overall weight of the gas turbine engine and does not require extensive maintenance.

According to the present invention, a gas turbine engine includes a variable area nozzle having a plurality of flaps actuated by a plurality of actuating mechanisms driven by shape memory alloy ("SMA") actuators to vary fan exit nozzle area. Each actuating mechanism includes a four bar linkage with a drive arm engaged by the SMA actuator. The SMA actuator has a deformed shape in its martensitic state and a parent shape in its austenitic state. The SMA actuator is heated to transform from martensitic state to austenitic state generating a force output to actuate the flaps. The SMA actuator is allowed to cool or is actively cooled to transform from austenitic state to martensitic state.

The variable area nozzle also includes a plurality of return mechanisms deforming the SMA actuator when the SMA actuator is in its martensitic state. In one embodiment of the present invention, the return mechanism is spring actuated. In another embodiment of the present invention, the return mechanism comprises a secondary SMA actuator engaging the drive arm of the four bar linkage.

According to one aspect of the present invention, the SMA actuator engages a four bar linkage to generate a sweeping motion. Depending on the configuration of the four bar linkage, the motion can be either parallel or non-parallel.

One major advantage of the present invention is that the SMA actuated variable area nozzle does not require complex mechanisms necessitating extensive maintenance.

Another major advantage of the present invention is that the SMA actuated variable area nozzle does not add significant weight to the engine, thereby improving the benefits associated with the overall fuel efficiency increase of the gas turbine engine.

The foregoing and other advantages of the present invention become more apparent in light of the following detailed description of the exemplary embodiments thereof, as illustrated in the accompanying drawings.

BRIEF DESCRIPTION OF THE DRAWINGS

FIG. 6 is a simplified, side elevation of the four bar linkage engaged by the SMA actuator of FIG. 4 taken along line 6—6;

FIG. 8 is a simplified, side elevation of the actuating and return mechanisms engaged by the primary and secondary SMA actuators of FIG. 7 taken along line 8—8;

DETAILED DESCRIPTION OF THE PREFERRED EMBODIMENT

Figure 1:
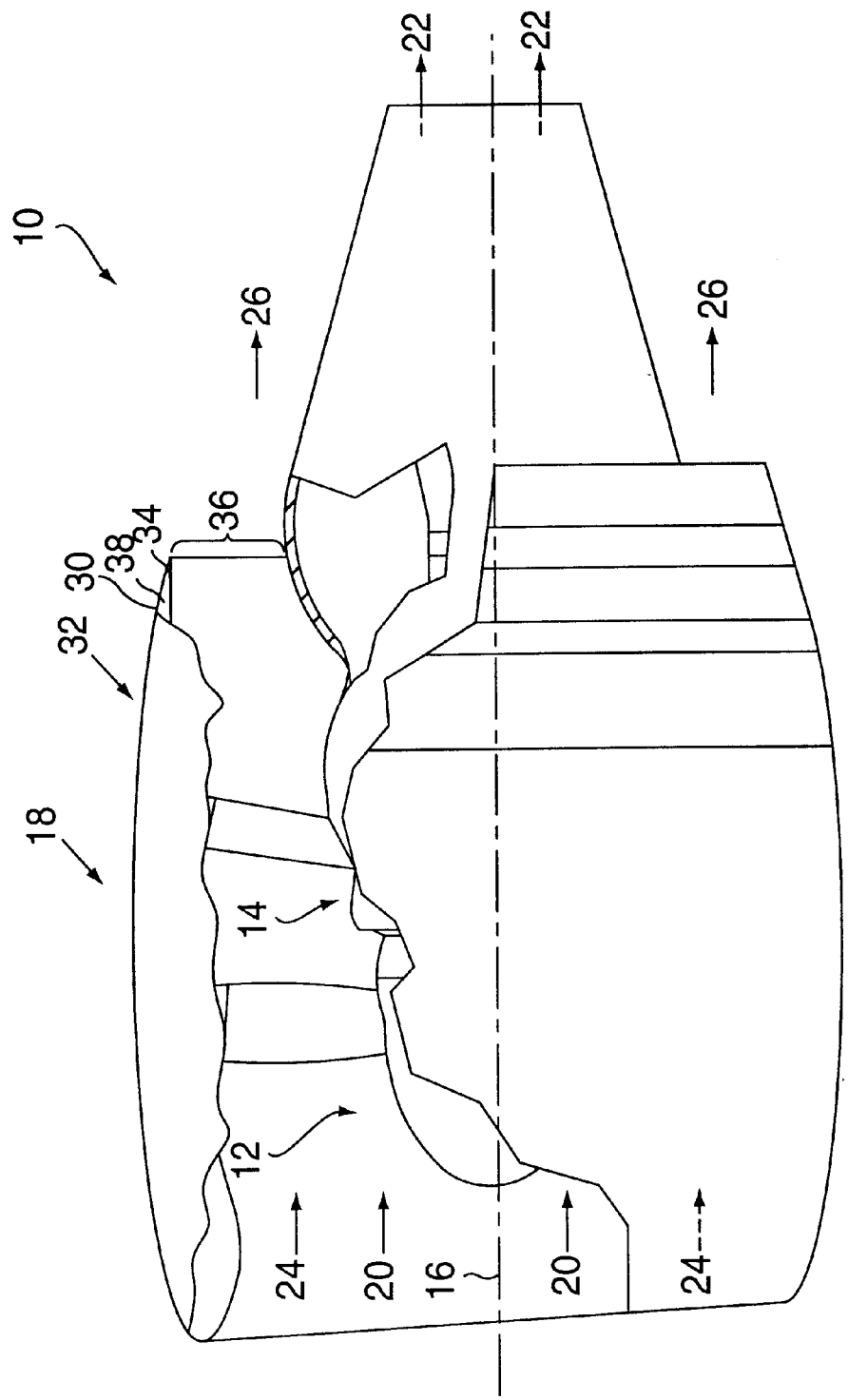
FIG. 1 is a partially broken away, simplified representation of a gas turbine engine with a variable area nozzle.

Referring to FIG. 1, a gas turbine engine 10 includes a fan section 12 and a core engine 14 disposed sequentially about a longitudinal axis 16. The core engine 14 and the fan section 12 are enclosed in a nacelle 18. An annular path of primary airflow 20 passes through the fan section 12 and the core engine 14, generating primary thrust 22. An annular path of fan flow 24, disposed radially outward of the path of the primary air flow 20, bypasses the core engine 14 and flows through the fan section 12, generating fan thrust 26.

Figure 2:
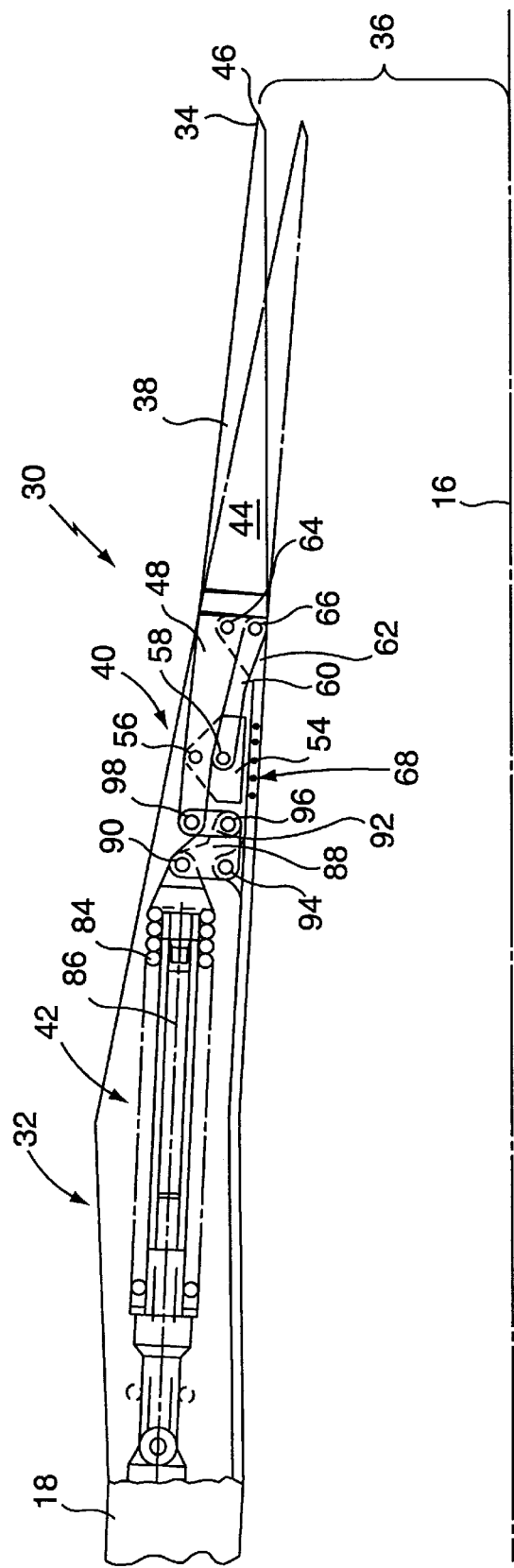
FIG. 2 is an enlarged, simplified representation of the variable area nozzle of FIG. 1 in the diverged position, driven by a SMA actuator, according to the present invention.
Figure 3:
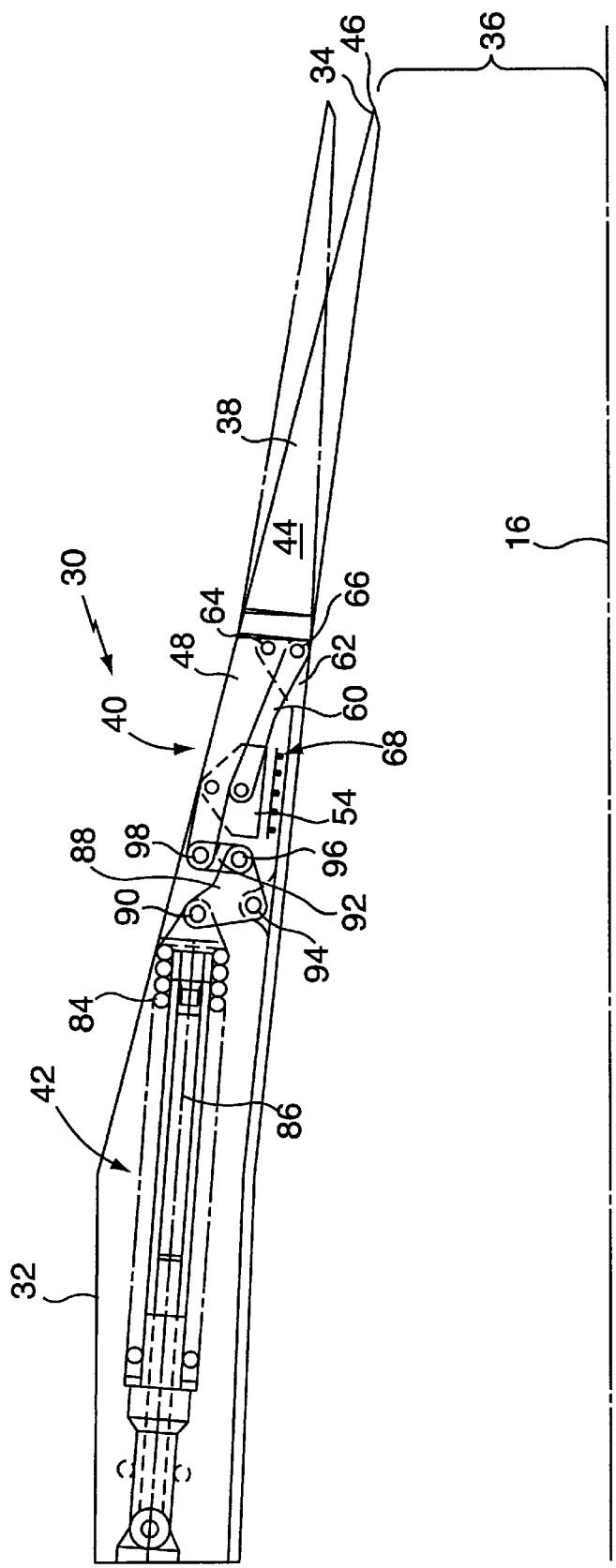
FIG. 3 is a simplified representation of the variable area nozzle of FIG. 2 in the converged position.

A variable area nozzle 30, shown in greater detail in FIGS. 2 and 3, is disposed in a downstream portion 32 of the nacelle 18 with a trailing edge 34 of the nacelle 18 defining a fan exit nozzle area 36. Referring to FIGS. 2 and 3, the variable area nozzle 30 includes a plurality of flaps 38, circumscribing the core engine 14, a plurality of actuating mechanisms 40, and a plurality of return mechanisms 42, with each actuating mechanism 40 and each return mechanism 42 corresponding to each flap 38. Each of the plurality of the flaps 38 includes an aerodynamically shaped body 44 with a flap tip 46, coinciding with the trailing edge 34 of the nacelle 18, and a flap actuating portion 48, extending upstream into the nacelle 18. The flaps 38 have a diverged position and a converged position. In the diverged position, shown in FIG. 2 and in phantom in FIG. 3, the flaps 38 define an opened or enlarged fan exit nozzle area 36. In the converged position, shown in FIG. 3 and in phantom in FIG. 2, the flaps 38 are driven by the actuating mechanisms 40 to define a closed or reduced fan exit nozzle area 36.

Figure 4:
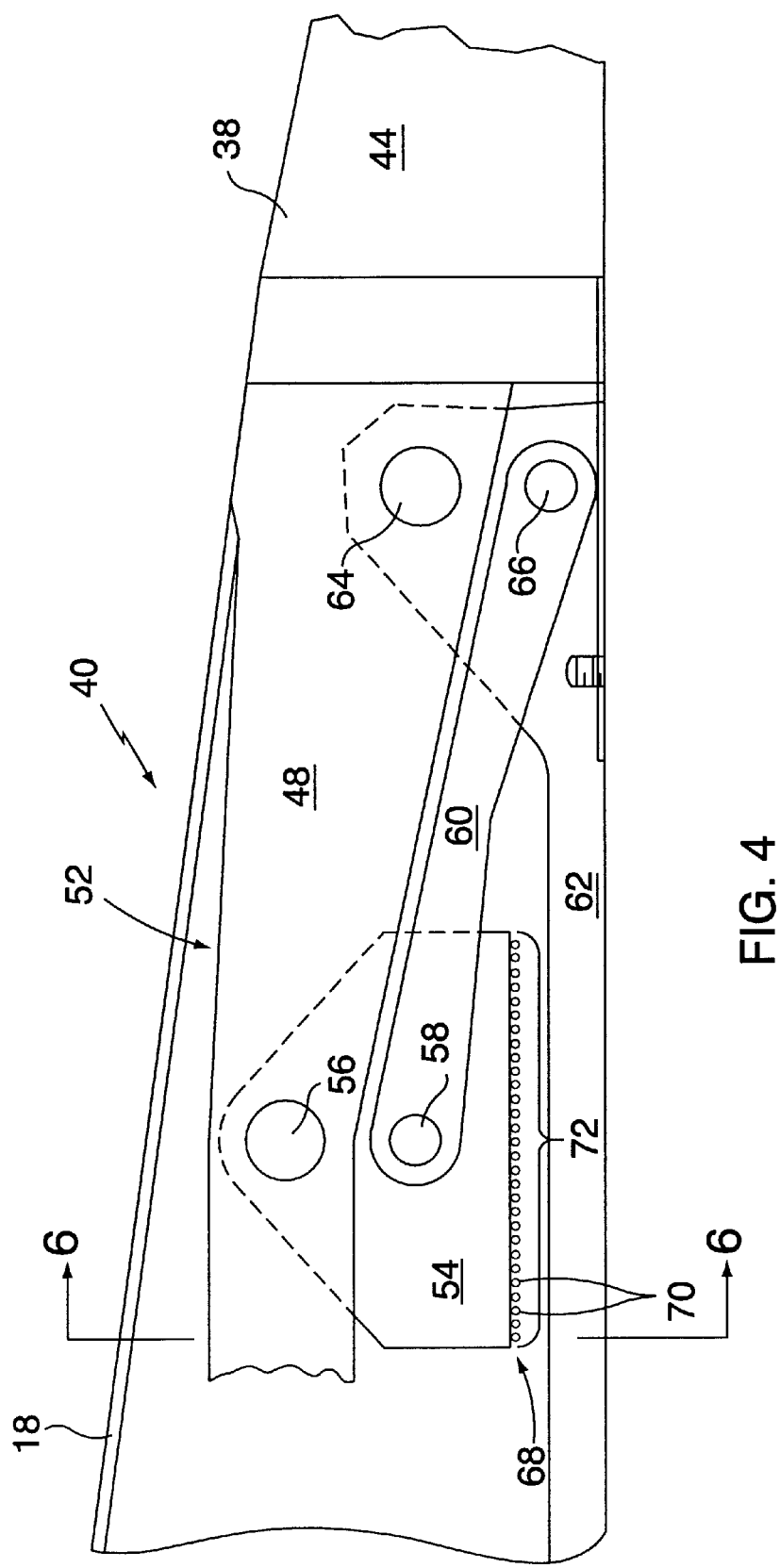
FIG. 4 is an enlarged, simplified representation of a four bar linkage of the variable area nozzle of FIG. 2 driven by the SMA actuator.

Referring to FIG. 4, each actuating mechanism 40 includes a four bar linkage 52 comprising a drive arm 54 pivotably connected by means of pivots 56, 58 to the flap actuating portion 48 and to a link 60, respectively. The four bar linkage 52 also includes a fixed member 62 that extends from the nacelle 18. The flap actuating portion 48 and the link 60 are pivotably attached to the fixed member 62 by means of pivots 64, 66, respectively. Pivot 64 functions as a hinge for the flap 38. The actuating mechanism 40 also includes a SMA actuator 68 engaging the drive arm 54 of the four bar linkage 52. In the preferred embodiment of the present invention, the SMA actuator 68 comprises a plurality of strands 70 forming an array 72.

Figure 5:
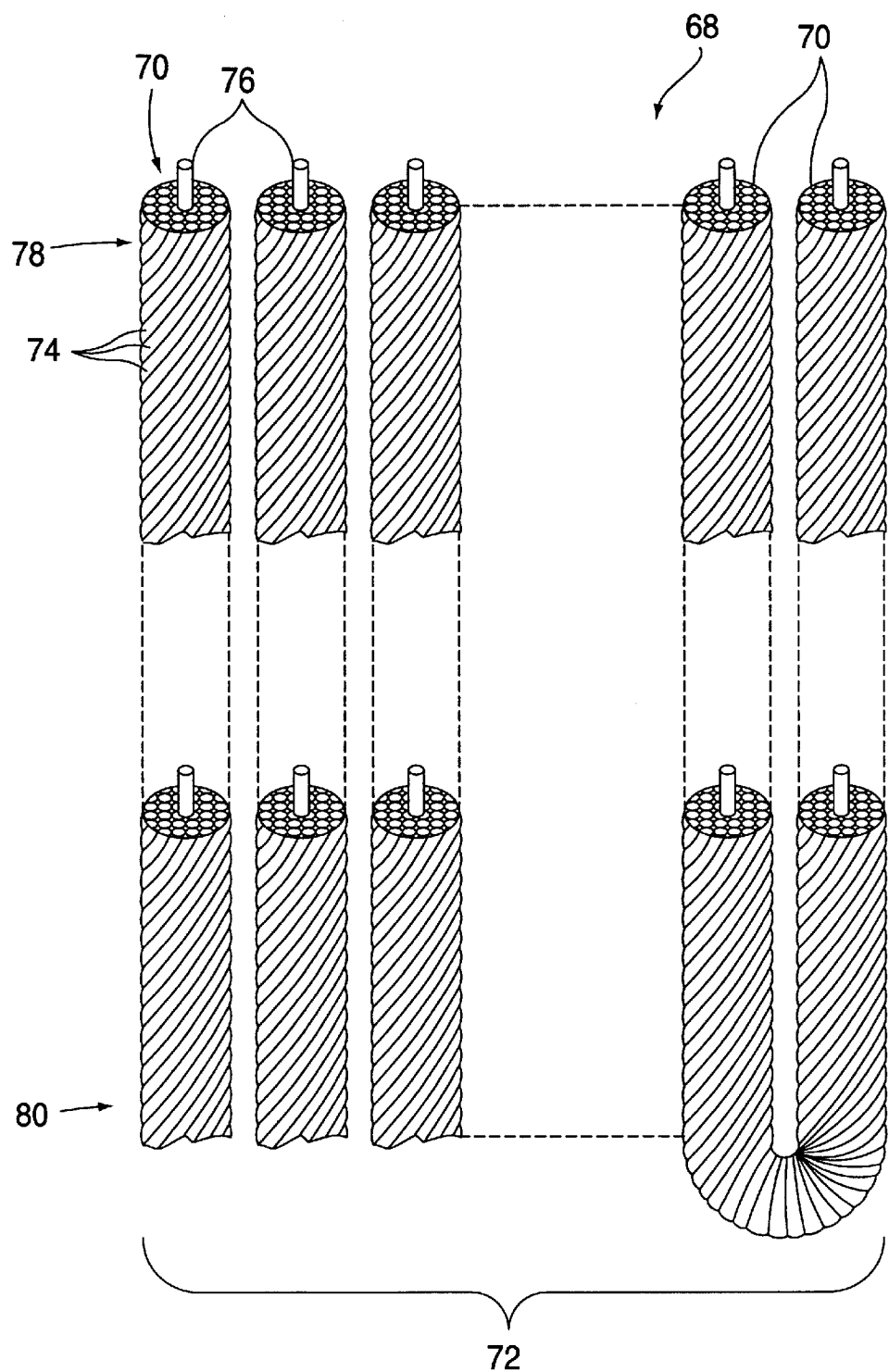
FIG. 5 is an enlarged, fragmentary, perspective view of the SMA actuator of FIG. 4.

Referring to FIG. 5, each strand 70 is formed from a plurality of SMA wires 74. In one embodiment of the present invention, each strand 70 includes a center wire 76 surrounded by six wires 74 forming a second row and twelve wires 74 forming a third row. Each SMA array 72 includes a first end 78 and a second end 80. The SMA actuator 68 also includes a control system 81 for providing heat input and at least two end terminations 82 formed at the first and second ends 78, 80 of the array 72, as shown in FIG. 6. The control system 81 communicates with the ends 78, 80 of the SMA array 72. In the preferred embodiment, a single strand 70 is looped to form the array 72 of fourteen (14) strands wide. A single strand formed into multiple passes lowers cost for end termination and provides improved consistency. However, the array 72 can be formed from multiple strands 70.

Referring to FIG. 6, the SMA actuator 68 is maneuvered among the plurality of the actuating mechanisms 40 such that the SMA actuator 68 alternatingly engages the drive arms 54 of each actuating mechanism 40 and a rib 83 separating the actuating mechanisms 40. The SMA actuator 68 has a parent shape and a deformed shape. In one embodiment, shown in FIG. 3, the parent shape of the SMA actuator 68, corresponds to the closed or converged position of the flaps 38, and the deformed shape of the SMA actuator 68, shown in FIG. 2, corresponds to open or diverged position of the flaps 38.

Referring to FIG. 2, each return mechanism 42, according to one embodiment of the present invention, comprises a spring 84 disposed about a shaft 86 which is anchored to the nacelle 18 on one end thereof and pivotably attaching to a first bracket 88 on the other end thereof by means of a pivot 90. The first bracket 88 is pivotably fixed to the nacelle 18 and to a second bracket 92 by means of pivots 94, 96, respectively. The flap actuating arm 48 is also pivotably attached to the second bracket 92 by means of a pivot 98. A mechanical restraint 99 may be included, as shown in FIG. 6.

In operation, during take-off and landing, the flaps 38 of the variable area nozzle 30 are in the diverged position, as shown in FIG. 2. In the diverged position, the flaps 38 define the opened or enlarged fan exit nozzle area 36. In the diverged position of the flaps 38, the SMA actuator 68 is in deformed shape. When the SMA actuator 68 is in the deformed shape, the SMA material is at a low temperature martensitic state. To maintain the SMA actuator in its deformed shape the SMA actuator 68 must remain at a temperature below its phase transformation temperature or be mechanically restrained.

Once the plane reaches its cruise mode, the plurality of flaps 38 are actuated into the converged or closed position, as shown in FIG. 3. To actuate the flaps 38 into the converged position, the SMA actuator 68 is heated above its phase transformation temperature into austenitic state. The control system 81 applies heat or voltage across the SMA material to heat the SMA actuator 68. As the SMA actuator 68 is transforming from its deformed shape into its parent shape, the SMA actuator contracts, pushing the drive arm 54 outward, as shown in FIG. 3. As the drive arm 54 is moved outward, the upstream end of the flap actuating portion 48 and the link 60 are also moved outward, forcing the downstream end of the flap actuating portion 48 to pivot inward about the pivot 64, thereby moving the flap tip 34 inward to reduce the fan exit nozzle area 36. The four bar linkage 52, as shown in FIG. 4, is configured to yield a substantially parallel motion of the SMA actuator 68. As the SMA array 72 moves outward, each of the SMA strands 70 is strained substantially the same amount, resulting in optimized work output for all SMA strands.

Once the flaps 38 need to be placed into the opened position for an aircraft to land, the control system 81 removes the heat from the SMA actuator 68 to allow the SMA material to return to its martensitic state. Additionally, for expedited transformation of the SMA material from austenitic state to martensitic state, the SMA actuator 68 can be actively cooled. As the SMA material transforms into its low temperature martensitic state, the return mechanism 42 overcomes the SMA actuator 68, thereby deforming the SMA material, as shown in FIG. 2. To deform the SMA actuator, the spring 84 acts on the first bracket 88 at pivot 90 forcing the pivot 96, joining the first bracket 88 and the second bracket 92, to rotate radially inward. As the first bracket 88 rotates about pivot 94, the upstream end of the flap actuating portion 48 is forced to move radially inward at the pivot 98. When the upstream end of the flap actuating portion 48 moves radially inward, the flap tip 34 is forced outward to enlarge the fan nozzle exit area 36 while the drive arm 54 is forced inward, deforming the SMA material.

Once the SMA material is deformed, the mechanical restraint 99 may be employed to ensure that the SMA material remains deformed. The mechanical restraint 99 can be a latch or a pin or any other mechanical device for maintaining the SMA array in its deformed shape. Alternatively, the return mechanism 42 can continue to retain the deformed position of the SMA. Additionally, the flaps 38 can be latched or the return mechanism 142 can be latched or restrained.

Figure 7:
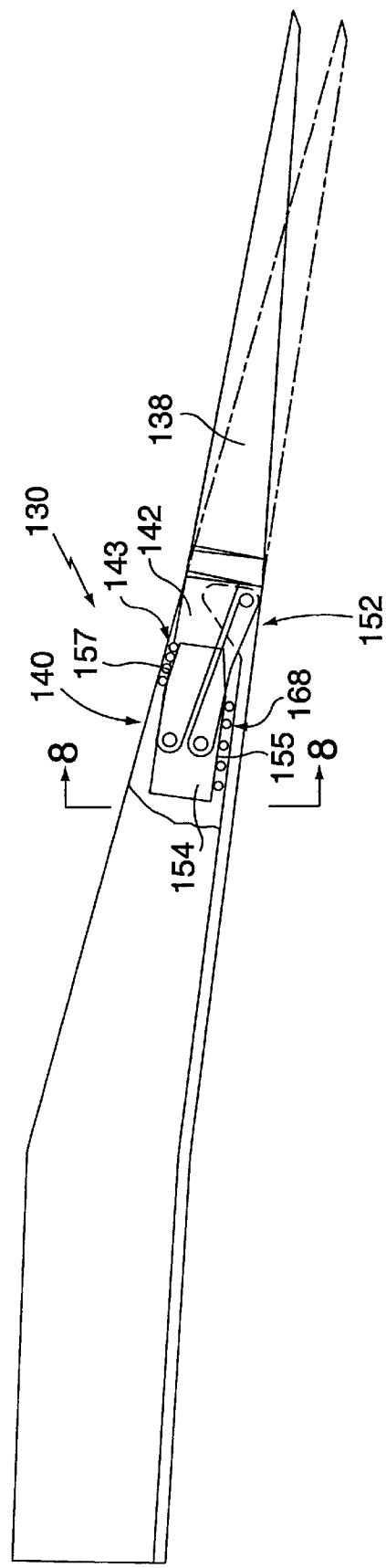
FIG. 7 is an enlarged, simplified representation of the variable area SMA actuator and nozzle of FIG. 1 with an actuating mechanism driven by a primary SMA actuator and a return mechanism driven by a secondary SMA actuator, according to another embodiment of the present invention.

Referring to FIG. 7, the variable area nozzle 130, according to another embodiment of the present invention, includes a return mechanism 142 actuated by a secondary SMA actuator 143. The variable area nozzle 30 includes an actuating mechanism 140 substantially analogous to that of the variable area nozzle 30 with the like elements designated by the like reference numbers preceded by numeral 1. The actuating mechanism 140 includes a four bar linkage 152 with a drive arm 154. The drive arm 154 has a first surface 155 and a second surface 157 with the first surface 155 being engaged by the primary SMA actuator 168 and the second surface 157 being engaged by the secondary SMA actuator 143. The secondary SMA actuator 143 has a parent shape, shown in FIG. 7, and a deformed shape (not shown). When the secondary SMA actuator 143 is in its parent shape, the primary SMA actuator 168 is in its deformed shape and when the secondary SMA actuator 143 is in its deformed shape, the primary SMA actuator 168 is in its parent shape. The secondary SMA actuator 143, similarly to the primary SMA actuator 168, comprises a plurality of SMA strands 170 formed into an array 172.

Referring to FIG. 8, the secondary SMA actuator 143 is looped through the gas turbine engine to prevent interference with the primary SMA actuator 168.

In operation, the actuating mechanism 140 operates substantially analogously to the actuating mechanism 40 described above to reduce the fan exit nozzle area 36. The return mechanism 142 is actuated by applying power or heat to the secondary SMA actuator 143. Once the secondary SMA actuator 143 is powered or heated, the secondary SMA actuator 143 transforms from its martensitic to its austenitic state, generating a force output to move the drive arm 154 radially inward. As the drive arm 154 is actuated inward, the primary SMA actuator 168 deforms and the drive arm 154 pulls the flap actuating portion 148 inward. As the flap actuating portion 148 is moved inward, the flap tips 134 are moved outward, enlarging the fan exit nozzle area 136. Thus, the primary and secondary SMA actuators 168, 143 cooperate to enlarge or reduce the fan exit nozzle area 136. The primary and secondary SMA materials are alternatingly heated (and/or cooled) to transform the SMA material from its martensitic state to its austenitic state (and vice versa). As the SMA material transforms from its deformed shape in martensitic state to its parent shape in austenitic state, the force output is generated by the primary and secondary SMA actuators 168, 143 to move the drive arm 154 outward or inward, respectively, to close or open the flaps 138, respectively. As the primary SMA actuator 168 generates the force output and moves the drive arm 154, the secondary SMA actuator 143 is deformed and vice versa. Additionally, to expedite the cycle, the SMA actuators 143, 168 can be cooled to hasten the transformation of the SMA material from austenitic state to martensitic state. The shape of the drive arm 154 allows the primary and secondary SMA actuators to translate motion while straining each SMA array substantially the same amount.

The variable area nozzles 30, 130 of the present invention achieve approximately 20% (twenty percent) change in the fan exit nozzle area 36, 136. The flaps 38 move approximately two to two and one-half inches (2" to 2.5") inward when actuated into the converged position. Such actuation is highly beneficial during cruise conditions to improve fuel efficiency. However, other systems can be tailored to achieve various degrees of actuation required for a particular application.

In order to effect change from the martensitic to austenitic phase, the SMA actuator 68 can be heated by many alternative power or heating sources and methods. For example, the SMA actuator 68 can be heated with hot air or hot water, conduction, convection or radiation heat, electrically, and/or by other means. However, in the preferred embodiment of the present invention, the control system 81 applies voltage across the SMA actuator 68 to heat and cause the transformation of the SMA actuator from martensitic state to the austenitic state. The amount of heat to be applied to the SMA actuator 68 to reach phase transformation temperature depends on various factors, such as how fast the SMA actuator must be actuated, overall size of the SMA actuator, and base temperature of the SMA actuator. Similarly, the SMA actuator 68 can be cooled by a variety of methods. For example, cool air can be circulated to cool the SMA material.

The amount of work the SMA actuator performs depends on the particular number of individual SMA wires 74 forming the SMA actuator 68 and the length of these wires. For example, if each individual wire 74 outputs X force and the SMA includes nineteen (19) wires, then the total output from the SMA actuator is approximately 19X. Thus, according to the present invention, various configurations of SMA actuators 68 can be formed to obtain the desired amount of force. In the preferred embodiment of the present invention, the SMA actuator 68 can generate approximately three-thousand (3,000) inch-pounds of moment about flap axis of rotation which coincides with pivot 64.

Additionally, in the preferred embodiment, the plurality of flaps 38 are sealed (not shown) therebetween to minimize air leakage.

The SMA wires 74 can be either pure nickel-titanium (NiTi) alloy or nickel-titanium alloy modified with various other elements (such as copper (Cu)) or another material that exhibits shape memory effect. The specific composition of the SMA can vary in order to optimize properties necessary for the particular application. In the preferred embodiment, the raw SMA wires were manufactured by Raychem Corporation of Menlo Park, Calif. However, various other companies also manufacture SMA material.

The SMA actuators 68 formed from substantially flexible SMA strands, can be terminated in a variety of different arrangements. The SMA strands 70 formed into arrays 72 can be also terminated in a variety of conventional mechanical terminations that are typically used in conventional wire rope making art.

Figure 9:
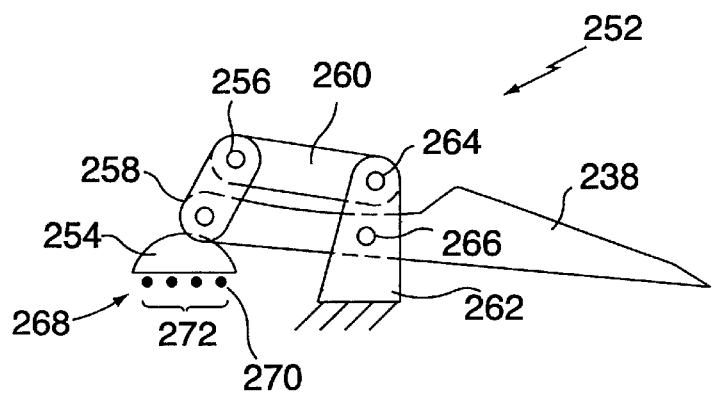
FIG. 9 is a schematic representation of another embodiment of a four bar linkage actuated by the SMA actuator of FIG. 5, with the SMA actuator being in a deformed state.
Figure 10:
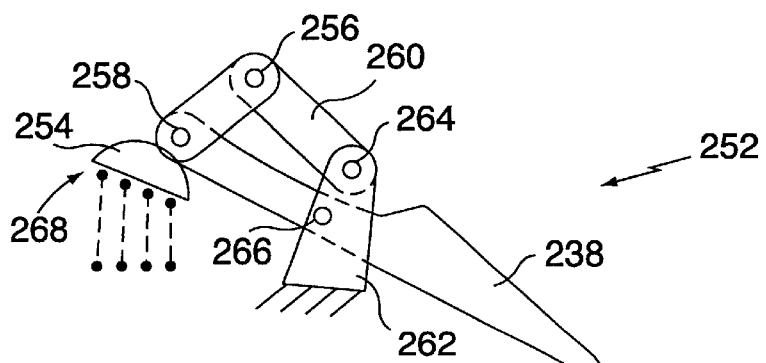
FIG. 10 is a schematic representation of the four bar linkage of FIG. 9, with the SMA actuator being in a parent state.
Figure 11:
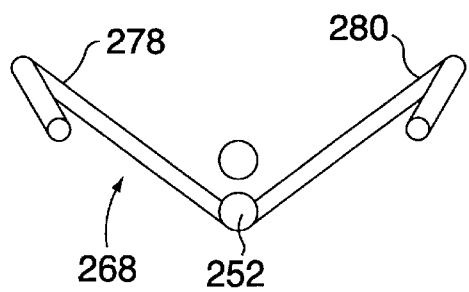
FIG. 11 is a schematic representation of a side elevation of the four bar linkage of FIG. 9.

Referring to FIGS. 9–11, another embodiment of a four bar linkage 252 driven by a SMA actuator 268 includes an output arm 254, with the SMA actuator 268 secured thereto, and a fixed arm 262. The four bar linkage 252 also includes a flap 238 and a link 260 connecting the output arm 254 and the fixed arm 262 by means of pivots 256, 264, respectively. The SMA actuator 268 has a first end 278 and a second end 280, as best seen in FIG. 11, and includes a plurality of SMA units 272 that can be formed from either SMA strands or SMA ropes, as discussed above and shown in FIG. 5. The first and second ends 278, 280 of the SMA actuator 268 are fixed, as shown in FIG. 11. The four bar linkage 252 is configured to translate a sweeping motion of the SMA actuator 268 in a non-parallel fashion. The four bar linkage 252, according to this embodiment of the present invention, can be used with complex geometry of the variable area nozzle or with any other mechanism that requires non-parallel motion.

The major benefit of the variable area nozzle 30, 130 and of the four bar linkage 52, 152, 252 driven by SMA actuators of the present invention is that they are actively controlled and used in multi-cycle applications to generate significant force output. One major advantage of these mechanisms is relative simplicity and compactness.

Another major advantage of the variable area nozzle 30, 130 of the present invention is that a gas turbine engine can be equipped with a variable area nozzle without incurring a significant weight penalty. The variable area nozzles 30, 130 of the present invention, driven by a SMA actuator, are substantially lighter than existing variable area nozzle configurations. The variable area nozzle 130 having a return mechanism 142 actuated by the secondary SMA actuator 143 is more advantageous and results in even greater weight savings. This advantage of the present invention allows practical use of the variable area nozzle on the gas turbine engines.

A further major advantage of the present invention is that the variable area nozzles, driven by at least one SMA actuator, do not require extensive maintenance. Unlike existing variable area nozzles that include complex mechanisms and are driven either hydraulically or pneumatically, the variable area nozzles 30, 130 of the present invention do not include a complex mechanism requiring expensive and time consuming maintenance.

A further advantage of the present invention is that the SMA actuator 68, configured from a plurality of strands 70 formed from a plurality of SMA wires 74, will not fail catastrophically under normal fatigue or overload situations. Since the SMA actuator 68 includes multiple smaller diameter wires, when one or more wires fail, such failure will be apparent during visual, electrical or other type of nondestructive inspection. Thus, when failure in one or several wires is detected, repair or replacement can be scheduled to avoid subsequent catastrophic failure.

While the present invention has been illustrated and described with respect to a particular embodiment thereof, it should be appreciated by those of ordinary skill in the art, that various modifications to this invention may be made without departing from the spirit and scope of the present invention. For example, although the preferred embodiment describes the SMA actuator 68 formed into an array of SMA strands, the SMA actuator 68 can be formed from a SMA rod or tube. Furthermore, the SMA actuator 68 can be formed from a plurality of individual SMA wires that are bundled together in various configurations of strands or ropes. Additionally, the SMA wires 74 can have a round cross-section or other shapes of cross-section. Moreover, although the SMA actuator 68 and the primary SMA actuator 168 are heated to close or deploy the flaps 38 of the variable area nozzle, the SMA actuator 68 and the primary SMA actuator 168 can be heated to open or place the flaps in the diverged position. Also, the parent shape of the SMA can be either contracted or expanded. Furthermore, the SMA actuators 68, 168 may include multiple terminations and multiple power sources. For example, the SMA actuators 68, 168 can be segmented with each SMA actuator segment spanning a half, a quarter or any other portion of the engine's circumference.

Additionally, various other return mechanisms can be used to deform the SMA actuator. Also, although the preferred embodiment of the present invention is described as having a return mechanism 42 and an actuating mechanism 40 corresponding to each flap 38, each return mechanism 42 and each actuating mechanism 40 can drive more than one flap 38. Furthermore, various other configurations of four bar linkages 52, 152, 252 are within the scope of the present invention.

We claim:

1. A mechanism comprising:
   a four bar linkage including a non-movable arm, an output arm, a flap and a link, each of the non-movable member and the output arm being coupled to both the link and the flap; and
   a SMA actuator, including a deformable element, engaging said output arm, said SMA actuator generating a force output upon transition from a martensitic state to an austenitic state.

2. The mechanism according to claim 1, wherein said four bar linkage is a parallel four bar linkage such that the deformable element of said SMA actuator cooperates with the four bar linkage to cause the output arm to move substantially in a parallel direction relative to a direction of motion of the deformable element.

3. The mechanism according to claim 1 wherein said four bar linkage is a non-parallel linkage such that the deformable element of said SMA actuator cooperates with the four bar linkage to cause the output arm to move substantially in a nonparallel direction relative to a direction of deformation of the deformable element.

4. The mechanism according to claim 1 wherein the deformable element of said SMA actuator comprises an array formed from a plurality of SMA strands.

5. The mechanism according to claim 1 wherein said SMA actuator has a first SMA end and a second SMA end with said first and second SMA ends being fixed.

6. The mechanism according to claim 1 wherein the deformable element of said SMA actuator is a rope.

7. The mechanism according to claim 1 wherein said SMA actuator is a rigid member.

* * * * *